Feb. 4, 1969
W. J. SLOAN
3,425,790
PROCESS FOR OBTAINING EQUILIBRIUM CONTROLLED AMOUNTS OF
HALOGEN AND/OR INTERHALOGEN IN A FLUID MEDIUM
Filed Jan. 31, 1967
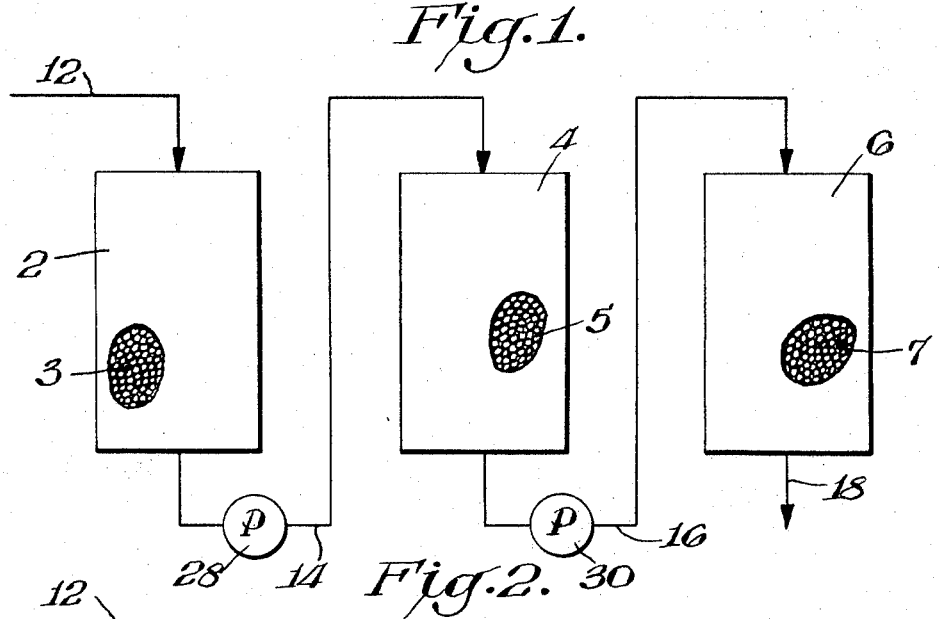
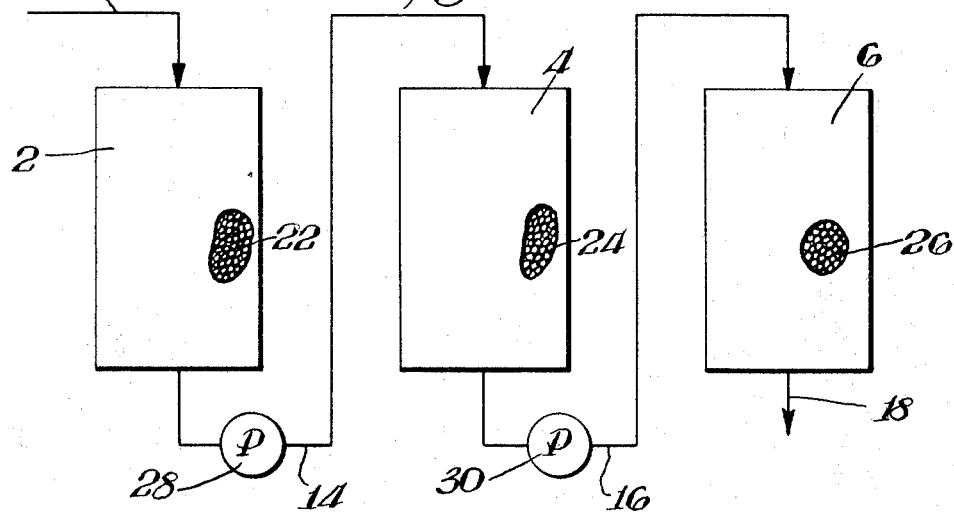

3,425,790
PROCESS FOR OBTAINING EQUILIBRIUM CONTROLLED AMOUNTS OF HALOGEN AND/OR INTERHALOGEN IN A FLUID MEDIUM
Walter John Sloan, 516 Wyndham Road, North Hills, Wilmington, Del. 19809
Filed Jan. 31, 1967, Ser. No. 612,975
U.S. Cl. 21—2                                  6 Claims
Int. Cl. A61l 1/00

ABSTRACT OF THE DISCLOSURE

A process for obtaining controlled amounts of halogen and/or interhalogen in a fluid medium by contacting a fluid medium and an anion exchange medium.

BACKGROUND OF THE INVENTION

Field of the invention

For many technical applications it is desirable to obtain a safe and easily controlled level of various halogens and/or interhalogens in a fluid (gaseous, liquid or semi-liquid) medium. For example, the use of halogens (e.g., iodine, bromine and chlorine) and interhalogens (e.g., bromine chloride) in small concentrations for disinfecting and sterilizing liquids such as water or liquid food products is well known.

Description of the prior art

Previously, it has been found very difficult to add, safely and easily, proportional or controlled amounts of halogens and interhalogens as solids, liquids, or gases to a fluid medium. Likewise, it has been found very difficult to add active compounds of these elements to obtain a desired concentration and to maintain such a concentration. Expensive equipment, usually hydraulically operated, with necessary safety features has been required to add solutions of such sterilizing media to the fluid systems being treated. Moreover, in order to obtain a selected addition and residual of the sterilizing agent, it has been either necessary to meter and to regulate the sterilizing agent and the receiving system, or to make frequent analytical determinations of the system being sterilized.

Summary of the invention

The present invention relates to obtaining an equilibrium controlled content of halogen and/or interhalogen in a fluid medium. More particularly, the invention is directed to obtaining a controlled concentration of halogen and/or interhalogen in a fluid medium, said medium acting as a carrier, by effectively contacting a fluid medium and an anion exchange medium.

The equilibrium established between the anion exchange medium and the fluid medium serves to control the concentration of halogen and/or interhalogen ultimately found in the fluid medium. Thus, if the concentration of halogen and/or interhalogen in the fluid medium is initially too high, halogen and/or interhalogen will be sorbed onto the exchange medium and conversely if too low, halogen and/or interhalogen will be released by the exchange medium. This fact leads to a simple and inexpensive means for insuring a constant halogen and/or interhalogen concentration regardless of the amount of halogen and/or interhalogen initially existing and without loss of total halogen and/or interhalogen values. Furthermore, the anion exchange medium can be reused, thus reducing overall cost.

An object of this invention is to obtain controlled concentrations of halogen and/or interhalogen in a fluid medium. An additional object is to obtain such concentrations in a simple fashion which does not require the use of expensive equipment and which minimizes the handling of dangerous chemicals. A further object is to obtain controlled concentration in either batch or continuous processes without the necessity to employ metering or regulating devices. Another object of the invention is to obtain such concentrations substantially independent of time, temperature or initial concentration, and on a consistently reproducible basis. Other objects of the invention will become apparent as the description proceeds.

It has now been found that these and other objects can be attained and that a halogen and/or interhalogen concentration of predetermined level can be obtained in a fluid medium in a simple and safe manner by contacting the fluid medium with an anion exchange medium, preferably an anion exchange resin. Either the fluid medium or the ion exchange medium may contain the desired halogen and/or interhalogen. Upon contacting the fluid medium and the anion exchange medium there is almost immediately achieved an equilibrium. Depending upon whether the fluid medium or exchange medium contains the non-equilibrium amount, the halogen or interhalogen is either sorbed onto the exchange medium or released into the fluid medium. This action of the halogen or interhalogen is substantially independent of time. Once the equilibrium has been established, no further increase or decrease in halogen and/or interhalogen concentration in the fluid medium occurs regardless of the subsequent length of contact. This phenomenon means that in batch operations wherein the exchange medium contacts the fluid medium for relatively long periods of time, the concentration in the fluid medium remains constant. On the other hand, where continuous operation is effected, e.g., in a column, the equilibrium is rapidly established insuring that the effluent fluid medium contacted with the exchange medium has a constant concentration despite relatively short contact times.

Brief description of the drawing

The present invention is illustrated by the attached drawing wherein like reference numerals denote similar elements and wherein:

FIG. 1 is a drawing of one embodiment according to the invention wherein influent fluid contains no halogen or interhalogen and FIG. 2 is a drawing of another embodiment according to the invention wherein influent fluid contains excess halogen or interhalogen.

Description of the preferred embodiments

FIG. 1 depicts one embodiment according to the invention. Fluid medium (thereafter illustrated by water) containing initially no halogen or interhalogen is conducted through a system comprising three columns, 2, 4 and 6, interconnected by conduits 14 and 16 having pumps 28 and 30. The water enters the system through conduit 12 and to column 2. Column 2 contains anion exchange medium (hereafter illustrated by resin 3) onto which is loaded or sorbed the desired halogen and/or interhalogen. The halogen and/or interhalogen concentration on resin 3 is not critical but, of course, is somewhat greater than the desired residual equilibrium content to be imparted to the water. The water passes downwardly through column 2 and, during passage, halogen and/or interhalogen is released into the water. The amount released at the start is higher than the ultimate equilibrium amount due, inter alia, to the initial relatively high concentration of halogen or interhalogen on resin 3. As such, the effluent from column 2 contains free halogen or interhalogen (for example, 30 to 60 p.p.m.).

The effluent from column 2 is conducted through conduit 14 by means of pump 28 to the top of and downwards through column 4. Column 4 contains anion exchange resin which is initially free of halogen and/or interhalogen. The excess halogen and/or interhalogen contained in the influent water introduced into column 4 is sorbed onto resin 5 in the course of passage through column 4. As such, the effluent water from column 4 normally contains the desired amount or "residual" of halogen and/or interhalogen (usually 0.1 to 0.5 p.p.m.). Since minor variations in temperature, time, surface area, etc., occur and more importantly since the "reaction zone" constantly shifts downward as explained later, a third or safety column 6 is provided connected to column 4 through conduit 16 and pump 30. Not only does this avoid an inadvertent breakthrough of a higher than desired residual concentration but also it allows a rearrangement in the column location.

Column 6 contains anion exchange resin 7 which initially is not loaded with halogen or interhalogen. If the water introduced through conduit 16 has the desired residual halogen and/or interhalogen concentration, there is no effect on this concentration during the passage through column 6. If the water has excess halogen and/or interhalogen, the excess is sorbed and equilibrium reached.

During continuous operation of the process according to FIG. 1, water is introduced into the system through conduit 12 and, containing the desired residual concentration, is removed from the system through conduit 18. The halogen and/or interhalogen sorbed on resin 3 is constantly removed and imparted to the water, beginning at the top of column 2. The water leaving column 2 normally contains free halogen and/or interhalogen which is sorbed onto resin 5 in column 4 beginning at the top. The sorbtion onto the resin or release into the water occurs substantially at the first area of contact between resin and water. The removal from or sorbtion onto the anion exchange resin is accompanied by a distinct change in color. Hence a progressive change in color occurs in a moving "front" along the direction of flow which is easily discernible by a change in color. For this reason the columns, if not constructed of a transparent material, per se, may be advantageously provided with a suitable window or means for removing small amounts of resin at suitable locations. The differences in color are indicative of the amount as well as the existence of halogen or interhalogen sorbed on the resin. This difference provides a simple and effective means of determining when the column arrangement should be changed.

After a period of time, depending, inter alia, on the volume and length of the columns and the flow rate, the color of resin 3 in column 2 will have progressively changed from top to bottom until resin 3 has completely changed in color, indicating that substantially all halogen and/or interhalogen has been removed from resin 3. A concurrent progressive color change will occur in column 4 indicating that resin 5 (or a part thereof) is now sorbed or loaded with halogen and/or interhalogen. At this point, the columns can be interchanged, with column 4 replacing column 2 while column 2 replaces column 4 or 6. Alternatively the process can continue until resin 5 has changed progressively to a color indicating that it contains no halogen or interhalogen while resin 7 has changed progressively to a color indicating that it is substantially loaded or sorbed with halogen or interhalogen ions. It is, of course, obvious that the moving "front" should not reach and exceed the bottom of column 6. When this occurs the effluent leaving column 6 will contain, as leakage, more than the desired residual concentration.

It is further apparent that the number and arrangement of columns can be varied and that the substitution of one column for another after the process has proceeded for some time can be varied. For example, only one column of suitable length can be used, the first portion filled with resin being loaded with halogen or interhalogen while the latter portion of resin is not. This is normally of limited usefulness since it precludes rearrangement of columns which makes full advantage of the invention. Rather than physically shifting the columns, the columns can remain stationary and the order of columns through which the water passes can be varied by suitable shunting and valve devices well known in the art. Such devices can be operated manually or automatically based upon color change or predetermined time intervals.

FIG. 2 depicts an additional embodiment wherein the fluid medium (hereafter exemplified as water) initially contains the halogen and/or interhalogen. Water entering column 2 through conduit 12 initially contains a concentration of halogen and/or interhalogen in excess of the desired residual (obtained, for example, by bubbling $Br_2$ through water or water containing a dissolved bromide salt). The initial concentration is not critical except, of course, that it will somewhat exceed the desired residual.

Column 2 contains anion exchange medium (hereafter illustrated by anion exchange resin 22) which has no halogen and/or interhalogen sorbed thereon. During passage of the water through column 2, resin 22 sorbs halogen and/or interhalogen from the water. The effluent leaving column 2 is conducted through conduit 14 and into column 4. The effluent from column 2 normally still contains excess halogen or interhalogen ions although it is of course possible, depending upon such factors as length of column, flow rate, etc., that a desired residual concentration of, for example, less than 0.5 p.p.m. is reached in column 2.

Columns 4 and 6 likewise contain resin 24 and 26, respectively, which have initially no halogen or interhalogen sorbed thereon. At some point during the passage of water through columns 4 and 6 the desired residual concentration will be reached and regardless of the further contact with unloaded resin, little or no change in concentration will result.

The same moving front and color changes described above with reference to FIG. 1 will occur in the process of FIG. 2. It is immediately apparent that the same alternatives as to number of columns is available and that the columns may be interchanged (by physically moving the columns or by shunt or valve means) in the same basic manner.

The above described process embodiments may be conducted separately or simultaneously, one a part of another. The processes allow full utilization of all halogen or interhalogen values while providing a controlled effluent concentration. The reuseability of the anion exchange resin contributes to the economy of operation. While each column will normally contain the same type of anion exchange resin, this is not critical and different resins may be utilized.

From the above it will be seen that continuous operation according to the invention involves the establishment of essentially two zones. The first zone can be characterized as a release zone wherein a donor of halogen or interhalogen (the fluid medium or the anion exchange medium containing an amount of halogen, interhalogen or mixture thereof in excess of the equilibrium amount, is brought into effective contact with an acceptor of halogen or interhalogen (an anion exchange medium or a fluid medium, respectively, which contains from zero up to the equilibrium concentration). During this contact the donor releases halogen, interhalogen or a mixture thereof to the acceptor.

Since in practical operation, zone one involves the use of a donor having a high excess over the desired residual or concentration, a temporary equilibrium is established which results in an imparted concentration to the acceptor higher than the ultimate equilibrium concentration.

In zone two (according to the process of FIG. 1) the acceptor of zone one (fluid medium) comes into effective contact with a new acceptor (anion exchange medium having no halogen, interhalogen or mixture thereof). The acceptor of zone one becomes a donor in zone two and releases halogen, interhalogen or mixtures thereof until the equilibrium concentration is reached. In the process of FIG. 2, the donor (fluid medium) comes into contact with an addition acceptor (exchange medium having no halogen, interhalogen or mixture thereof) and the equilibrium level is established. At this point, once equilibrium level is reached in either process, no further release will occur regardless of the length of time of further contact.

In actual operation, zones one and two will not be distinctly separated but one zone merges into another unless there is a physical separation by columns. As the process proceeds, a reaction zone moves through the resin bed in the direction of flow.

The excess of halogen, interhalogen or mixture thereof in zone one over the desired ultimate equilibrium amount is not critical according to the invention. This is due to the fact that the total length of resin having no halogen, interhalogen or mixture thereof is sufficiently large to insure that the desired equilibrium is reached. Achieving ultimate equilibrium concentration depends on having at least a "minimum contact" between the fluid medium and unloaded resin such that the unloaded resin will sorb all but the equilibrium amount. This minimum contact can be easily determined by simple experimentation. The length of excess unloaded resin normally exceeds greatly the required minimum since, as stated earlier, the reaction zone or "front" moves progressively along the direction of flow. Preferably the initial halogen and/or interhalogen source (fluid medium or anion exchange resin) will be fully saturated or loaded with halogen and/or interhalogen.

The effectiveness of pick-up of halogen, interhalogen or mixtures thereof is related, at ambient temperature, to resin particle size, flow rate and bed depth. For example, a 50 to 100 mesh strong base resin shows a most effective removal of bromine from the fluid medium when $$\frac{\text{inches of resin bed depth}}{(\text{Gal. per min.})/(\text{Square feet})} = 0.5 \text{ or larger}$$

This value will decrease for smaller particles and increase for larger particles (i.e., change in surface area contact). The value, however, is easily determined for a given set of conditions.

The following is an example of the continuous process conducted in accord with the invention.

15 ml. of liquid bromine were mixed with about 100 ml. of common tap water. 35 ml. of Rohm and Haas "Amberlite" IRA–400–Cl form (a strong base anion exchange resin of the polystyrene, quaternary ammonium type), were added to the bromine-water mixture and shaken until the resin did not pick up any more bromine. 20 ml. of bromine bearing resin so produced were well rinsed with water and transferred to a 50 ml. glass column having glass wool as a resin support. (10.4 ml. of resin is equivalent to 10.0 cm. length.)

A second column of the same dimensions was prepared in a similar manner except it contained 20.6 ml. untreated "Amberlite" IRA–400–Cl form resin. The columns were connected in series such that the effluent from the first column containing bromine saturated resin flowed into and through the resin bed which did not contain any bromine.

Water was conducted through this system and after ten minutes of operation at 31 ml./minute, throughput, the effluent from the second column had a bromine concentration of 0.2 p.p.m. After twenty minutes of operation, the first column effluent contained 1,000 p.p.m. as bromine. After one hour of operation at the same flow rate, the first column effluent concentration 600 p.p.m. of bromine, and the second column effluent tested as 0.8 p.p.m. bromine. At this time the top of first column was becoming yellow like the Cl form of the resin, and the bottom was bright red. The top 8.8 cm. of the second column was a red band resin containing bromine sorbed from column one effluent. This was the approximate height of the reaction zone for a rather high flow rate of about 8 gal./(min.)(sq. ft.).

While the above description relates to continuous processes according to the invention wherein one or more columns are utilized, the invention also has applicability to batch processes wherein, for example, the fluid medium containing no halogen, interhalogen or mixture thereof is contacted with loaded anion exchange resin. This process is illustrated as follows wherein the invention is utilized for the sterilization of water.

Five 60 ml. samples of water were taken. Into four of these samples was placed 1 ml. of resin containing the halogens or interhalogens listed below, and one sample (No. 5) was used as a control.

TABLE I

| Sample No. | Anion resin [1] | P.p.m. imparted to water [2] |
|---|---|---|
| 1 | Br | >3 |
| 2 | BrCl | 0.8 |
| 3 | I | 0.2 |
| 4 | ICl | 0.2 |
| 5 | | |

[1] The resin used was Nalco SBR-P, Cl form in 20 to 50 mesh form (a strong base anion exchange resin made by Dow Chemical Company comprising polymerized styrene with divinylbenzene as a cross linking agent).
[2] The resin was placed in a sterile bottle and the water was added. The sample was shaken many times and stored overnight in a refrigerator.

The samples were then subjected to bacteriological examination with the following results:

TABLE II

| Sample | 1 | 2 | 3 | 4 | 5 |
|---|---|---|---|---|---|
| Bacteria per ml. at 35° C. (tryptone glucose extract agar) | | | | | |
| 24 hours | 24 | 43 | 28 | 11 | 3,650 |
| 48 hours | 48 | [1] 44 | [1] 30 | 12 | 4,860 |
| Coliform organisms at 35° C. (nutrient lactose broth) | | | | | |
| 24 hours | 0/5 | 0/5 | 0/5 | 0/5 | 5/5 |
| 48 hours | 0/5 | 5/5 | 0/5 | 0/5 | 5/5 |
| Confirmatory tests—coliform organisms at 35° C. (brilliant green bile 2%) | | | | | |
| 24 hours | 2/2 | | | | 2/2 |

[1] These samples were completely covered with mold after 48 hours which made it nearly impossible to make a plate count.

In tests conducted with the same Nalco SBR resin as used above it has been found that regardless of contact time the equilibrium amount, once established, will remain constant. Thus when one ml. of the resin containing bromine was contacted with 100 ml. water for a period extending to 166 minutes, the residual concentration in the water remained constant.

As the anion exchange medium, any of the well-known anion exchange resins can be used in the present invention. Such resins include both the so-called strong base anion and weak base anion exchange resins. Strong base and weak base resins are commercially available and are illustrated by the materials described in United States Patents 2,591,573 and 2,591,574, respectively, as well as United States Patent 2,613,200. The strong base resins are usually divided into three types. Type 1 resins are understood to have

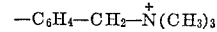

groups, the Type II resins the

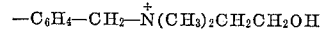

groups, and a third type based upon pyridine. These resins are essentially long chain-like and web-like water-insoluble molecules characterized by having quaternary ammonium groups as the fixed, i.e., non-exchangeable cationic sites. Associated with these sites are anions (which make the resin electrically neutral and which are the exchangeable constituents) that may be varied as desired by proper treatment as is well known in the art. Typical resins are based on the polystyrene backbone; divinylbenzene cross-linking units provide the necessary degree of dimensional stability and water-insolubility to to the polymer, while groups of the formula,

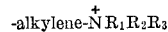

provide the positively charged sites. $R_1$, $R_2$ and $R_3$ are usually alkyl such as methyl, ethyl and the like, but may be alkylol such as hydroxyethyl, and may be joined to constitute along with the nitrogen atom a heterocyclic radical such as methylpiperidinium or pyridinium. Resins such as these may be prepared by chloromethylating a polystyrene-divinylbenzene copolymer, then reacting with the appropriate tertiary amine.

The resins are available under numerous commercial names such as "Duolite" (Diamond Alkali Co.), "Dowex" (Dow Chemical Co.), "Amberlite" (Rohm and Haas Co.), and "Permutit" (The Permutit Co.). Additional examples of suitable anion exchange resins can be found in U.S. Patents 2,591,573, 2,630,427, 2,597,494, 2,597,440, 2,900,352, 2,614,099, 3,098,716 as well as pages 1492 to 1498 of the Handbook of Chemistry and Physics, 42d edition. The resin used should be so chosen that it is substantially insoluble in the fluid medium employed. Many of these resins have already been approved by the Food and Drug Administration for use in conjunction with food for human consumption. Such resins are particularly useful when the present invention is utilized in conjunction with fluids (e.g., water or liquid food products for human consumption).

The resins may be utilized in many physical forms such as rods, sponges, beads, blocks, wafers, structural elements, admixed with coating agents such as paints, etc. The physical form is not critical it being important only that a substantial surface area of the resin is in contact with the fluid medium.

The desired halogen and/or interhalogen ions can be initially loaded or sorbed onto the resin in any manner known in the art. It is known (Aveston et al., Chemistry and Industry, September 1957 and U.S. Patent 3,101,250) that the halide forms of anion exchange resins sorb halogens and bromine chloride (BrCl). Apparently, polyhalogenohalide anions of the formula $X_nY_m^-$ are formed where X is a halogen or an interhalogen and Y is the same or another halide ion. $n$ and $m$ are small numbers whose sum is odd, e.g., $Br_3^-$, $ClBr_2^-$, $ClBr_6^-$ and the like, depending on the amounts of halogens present. These poly-atomic halide ions are strongly held by anion exchange media. The exact physical and/or chemical means by which the ions are held by the anion exchange media are subject to some controversy and the theoretical means forms no part of the invention per se. The terms "sorb" and "chemisorb" are used in accord with the descriptions commonly found in the art.

The invention is not liimted to the strong base resins although they are usually preferred. The weak base resins can be used in a similar manner. Also the invention is not limited to ion exchange resins. Liquid anion exchange media, strong and weak base, are also suitable as carriers for halogens and/or interhalogens but they are less convenient to use.

The invention has applicability to the concentration control of halogen and interhalogen or mixtures of halogens and/or interhalogens in general. The specific choice will, of course, depend upon the use to which the invention is put. The halogens and interhalogens found most useful according to the present invention are Br, I, BrCl and ICl although other ions such as IBr and the like can be used.

The fluid medium in which the halogen and/or interhalogen concentration is controlled may be any fluid medium which acts as a carrier for the substances as opposed to a medium which reacts with the halogens and/or interhalogens. The medium may be a gas, a liquid, or a material having sufficient moisture to have an equilibrium effect, the nature of the medium depending upon the ultimate intent of the user. The fluid medium can be illustrated by water, liquid food products, aqueous solutions, air, nitrogen, paint, etc.

The process of the present invention is of value for many purposes. A particularly preferred use is in the sterilization of water supplies such as drinking water, wash water in hospitals, swimming pools, cooling towers, recycle water systems, etc. The process can also be used to produce antiseptics and disinfectants. The invention also finds use as a supply for halogen or interhalogens in chemical reactions or commercial preparations wherein the dangerous nature of the chemicals per se and the difficulty in shipping and packaging is to be avoided. With gaseous media the invention can be used to give controlled concentration of halogens and/or interhalogens in air (or other gases, e.g., nitrogen), which air is then used to sterilize various objects such as food containers, or space vehicles, and instruments. The anion exchange medium may be contacted with paint prior to application or it may be combined, for example, in powdered form with the paint prior to application. Even after drying, there is sufficient moisture for the medium to provide its equilibrium controlled release of halogen and/or interhalogen.

As examples, as small pills or wafers, the ion exchange resin loaded with halogen and/or interhalogen can be used by sportsmen or the military to sterilize water in canteens where the residual concentration remains constant despite the time of contact with the water. As structural members or contained in coating compositions the exchange resin can be used to sterilize water supplies in tanks, e.g., in boats, planes, camps, etc. The water in swimming pools can be continually sterilized by withdrawing a portion of the water and passing it through a bed of powder or bead form resin.

What is claimed is:

1. A process for obtaining an equilibrium controlled amount of a halogen, interhalogen or mixture thereof in a fluid medium comprising:
   (a) contacting a fluid medium carrying substantially no halogen, interhalogen, or mixture thereof, in a first zone, with anion exchange medium containing sorbed thereon halogen, interhalogen, or mixture thereof in excess of the desired equilibrium amount whereby halogen, interhalogen, or mixture thereof is released by the anion exchange medium into the fluid medium,
   (b) contacting the fluid medium from step (a), in a second zone, with anion exchange medium having sorbed thereon substantially no halogen, interhalogen, or mixture thereof whereby halogen, interhalogen, or mixture thereof carried by the fluid medium and in excess of the desired equilibrium amount is sorbed onto the anion exchange medium and the desired equilibrium amount of halogen, interhalogen, or mixture thereof is obtained in the fluid medium,
   (c) contacting the fluid medium obtained from step (b) with additional anion exchange medium containing substantially no halogen, interhalogen, or mixture thereof whereby no substantial change in the equilibrium amount is obtained, and
   (d) separating the fluid medium obtained in step (c) from the anion exchange medium.

2. A process according to claim 1 wherein at the start of the process, steps (a) and (b) are conducted in two separate zones A and B, respectively, interconnected by suitable means to conduct the fluid medium from zone A to zone B, during which the anion exchange medium in zone A and containing sorbed thereon halogen, interhalogen, or mixture thereof, releases, progressively and in the direction of fluid medium flow, halogen, interhalogen, or mixture thereof into the fluid medium until the halogen, interhalogen, or mixture thereof residual in the fluid medium is, or approaches, the desired equilibrium residual of less than 5 parts per million, during which the anion medium in zone B sorbs, progressively and in the direction of fluid medium flow, halogen, interhalogen, or mixture thereof from the fluid medium until the halogen, interhalogen, or mixture thereof residual in the fluid medium is the desired equilibrium residual of less than 5 parts per million whereupon unprocessed fluid medium is caused to flow first through zone B and thereafter through zone A.

3. A process according to claim 1 wherein the process is conducted in two or more separate zones interconnected by suitable means to conduct the fluid medium from one zone to another, during which at least one zone of anion exchange medium containing sorbed thereon halogen, interhalogen, or mixture thereof, releases, progressively and in the direction of flow, halogen, interhalogen, or mixture thereof into the fluid medium until the halogen, interhalogen, or mixture thereof residual in the fluid medium is the desired equilibrium residual of less than 5 parts per million, with at least one zone containing anion exchange material having substantially no halogen, interhalogen, or mixture thereof sorbed thereon which sorbs, progressively and in the direction of flow, halogen, interhalogen, or mixture thereof from the fluid medium until the halogen, interhalogen or mixture thereof residual in the fluid medium is less than 5 parts per million, and the fluid medium is then caused to flow first through a zone of anion exchange medium whose content of halogen, interhalogen, or mixture thereof has been increased, and thereafter through a zone of anion exchange medium whose content of halogen, interhalogen, or mixture thereof has been substantially depleted.

4. A process according to claim 1 in which the zones of anion exchange medium with and without sorbed halogen, interhalogen, or mixture thereof are either contiguous, or separated.

5. The process according to claim 1 wherein the fluid medium is a member selected from the group consisting of water, liquid food products, air, paint, and simple gases, the anion exchange medium is a member selected from the group consisting of strong base and weak base anion exchange resins, the halogen or interhalogen is selected from the group consisting of bromine, iodine, bromine chloride, iodine chloride and iodine bromide and the equilibrium controlled amount obtained in the fluid medium is sufficient to sterilize the fluid medium.

6. A continuous process for obtaining an equilibrium controlled amount of a halogen, interhalogen or mixture thereof in a fluid medium comprising
  (a) contacting a fluid medium carrying halogen, interhalogen or mixture thereof in an amount in excess of the desired equilibrium amount in a first zone with an anion exchange medium having sorbed thereon substantially no halogen, interhalogen or mixture thereof whereby halogen, interhalogen or mixture thereof are sorbed onto the anion exchange medium,
  (b) contacting in a second zone the fluid medium obtained from step (a) with additional anion exchange medium having sorbed thereon substantially no halogen, interhalogen or mixture thereof wherein additional halogen, interhalogen or mixture thereof is sorbed onto said anion exchanger medium and the desired equilibrium controlled amount is obtained in the fluid medium,
  (c) contacting the fluid medium obtained from step (b) with additional anion exchange medium containing substantially no halogen, interhalogen or mixture thereof whereby no substantial change in the equilibrium amount is obtained and
  (d) separating the fluid medium obtained in step (c) from the anion exchange resin.

References Cited

UNITED STATES PATENTS

| 2,754,261 | 7/1956 | Akeroyd | 210—37 X |
| 2,945,746 | 7/1960 | Shaw | 210—37 X |
| 3,101,250 | 8/1963 | Schoenbeck | 210—37 X |
| 3,316,173 | 4/1967 | Mills et al. | 210—62 |

REUBEN FRIEDMAN, *Primary Examiner.*

JOHN ADEE, *Assistant Examiner.*

U.S. Cl. X.R.

21—53, 58; 23—312; 55—71; 99—1; 210—37, 62